United States Patent [19]

Kawamura et al.

[11] Patent Number: 4,994,978

[45] Date of Patent: Feb. 19, 1991

[54] ACCELERATION/DECELERATION CONTROL APPARATUS

[75] Inventors: Hideaki Kawamura; Takao Sasaki, both of Hachioji; Kentaro Fujibayashi, Musashino, all of Japan

[73] Assignee: Fanuc Ltd., Minamitsuru, Japan

[21] Appl. No.: 296,056

[22] PCT Filed: Jun. 17, 1988

[86] PCT No.: PCT/JP88/00603

§ 371 Date: Jan. 6, 1989

§ 102(e) Date: Jan. 6, 1989

[87] PCT Pub. No.: WO88/10171

PCT Pub. Date: Dec. 29, 1988

[30] Foreign Application Priority Data

Jun. 17, 1987 [JP] Japan .................................. 62-150767

[51] Int. Cl.$^5$ .................................................. G05B 13/00
[52] U.S. Cl. .................................... 364/474.3; 318/561
[58] Field of Search .................... 364/474.3; 318/561, 318/571, 568.18

[56] References Cited

U.S. PATENT DOCUMENTS 4,250,438  2/1981  Onoda .................................. 318/561
4,328,450  5/1982  Gabor .................................. 318/561
4,328,452  5/1982  Ragen et al. ......................... 318/561
4,404,505  9/1983  Swanson et al. ..................... 318/561
4,486,693 12/1984  Hamati et al. ....................... 318/561
4,554,497 11/1985  Nozawa et al. ...................... 318/561
4,815,007  3/1989  Sakai et al. ........................... 318/571

Primary Examiner—Allen R. MacDonald
Attorney, Agent, or Firm—Staas & Halsey

[57] ABSTRACT

An acceleration/deceleration control apparatus according to the present invention is utilized in a numerical contorl unit in which a machine tool is provided with a machining program from a command tape (3) and the machining program is decoded to simultaneously control movement along a plurality of axes. In order to eliminate machining trajactory sag which occurs at the breaks between program blocks, the actual velocity of a controlled object during deceleration is compared with the commanded velocity in the next command data block by a comparator circuit (7). Until the actual velocity is less than the command velocity, a pulse distribution circuit (6) is stopped so as not to perform pulse distribution based on the next command data block. This improves the accuracy of position control by servomotors (1), (2) the acceleration/deceleration of which is controlled by interpolation data.

5 Claims, 3 Drawing Sheets

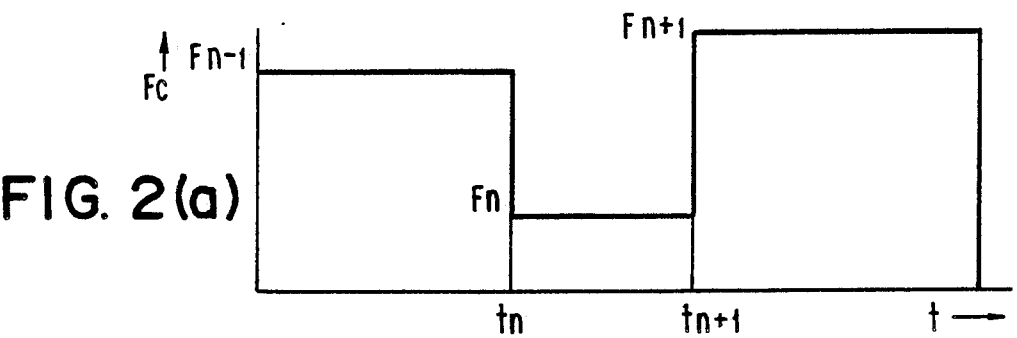
FIG. 2(a)
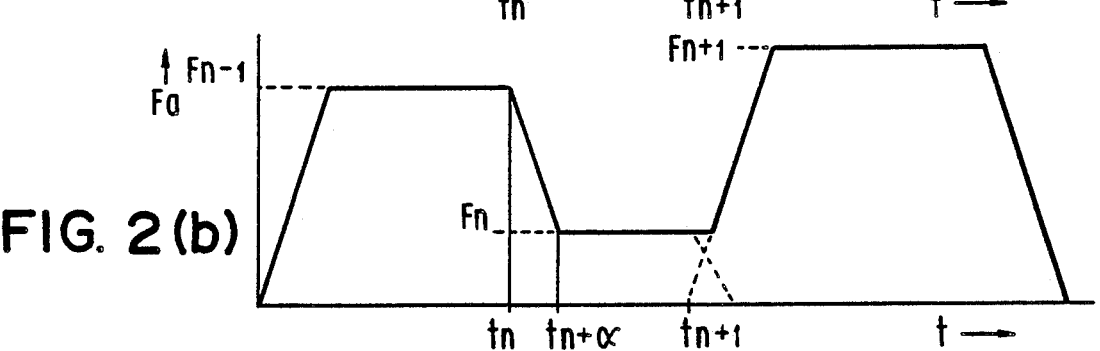
FIG. 2(b)
FIG. 3
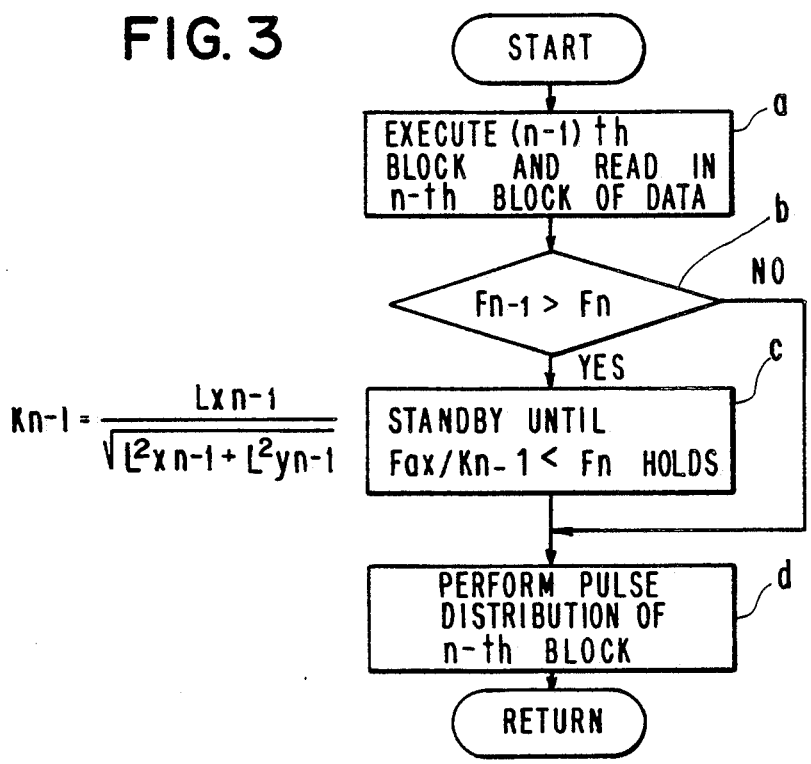
$$K_{n-1} = \frac{L_{xn-1}}{\sqrt{L^2_{xn-1} + L^2_{yn-1}}}$$

ACCELERATION/DECELERATION CONTROL APPARATUS

BACKGROUND OF THE INVENTION

1. Field of the Invention

This invention relates to an acceleration/deceleration control apparatus for controlling the acceleration/deceleration of a controlled object having a plurality of drive shafts of a tool or the like, such as a numerically controlled machine tool.

2. Description of the Related Art

In an ordinary machine tool, it is required that the velocity at which a tool is moved be set at an optimum value in dependence upon the material machined and the type of machining. In a case where drive shafts are controlled by a numerical control unit, the target position and velocity of a tool under control are commanded simultaneously from a command tape. In order to smoothen out the motion of the tool, distributed pulses for each axis are revised by an acceleration/deceleration circuit and the feed rate along each axis is decided.

When acceleration/deceleration is applied to a commanded velocity, accumulation occurs along each axis with regard to the commanded position of the controlled object, and a delay is generally produced at the control position. Since the amount of accumulation differs for each axis, a deviation in the trajectory of movement occurs at corner portions, where machining precision is required. In particular, when there is a gap in commanded velocity between consecutive command data blocks, the acceleration/deceleration control circuit is so arranged that the controlled object is stopped repeatedly and the next item of command data is read out after the object is stopped each time, thereby eliminating the accumulation along each axis.

If the above-mentioned deviation in the trajectory of movement occurs in such a conventional acceleration/deceleration apparatus, then when a transition is made from a command data block in which machining velocity rises with an increase in machining distance to command data block in which machining velocity falls with a decrease in machining distance in, say, a cutting operation. As a result, there is a greater amount of sag in the machined shape.

In particular, in a machining operation in which a machined shape 20, which is the goal of machining, has a protruding portion 20a, as shown in FIG. 4, a cutting tool (cutter) is controlled for back-and-forth machining. However, despite the fact that the tool is controlled by the same machining commands, there are occasions in which a deviation occurs between a machining path 21r from the right of the diagram and a machining path 21l from the left of the diagram. This deviation in machining trajectory, which is caused when machining a groove or a protrusion by back-and-forth machining, gives rise to a delay in response to command data on the servo mechanism side. In order to eliminate this deviation in trajectory, it is required that the velocity of cutting tool movement be sufficiently reduced in dependence upon the precision demanded by the object of machining.

More specifically, if a difference in level caused by a deviation in machining trajectory in back-and-forth machining is to be reduced or completely eliminated, as shown at point P in FIG. 4, a transition to the next block of processing must be made upon confirming stopping of the tool in every block of command data. With such conventional acceleration/deceleration control of a machine tool based upon this method of reading out command data, a problem that arises is a deterioration in machining efficiency.

SUMMARY OF THE INVENTION

The present invention has been devised in order to solve the foregoing problems and its object is to provide an acceleration/deceleration control apparatus for eliminating the deviation in the trajectory of a controlled object which arises when commanded velocity between mutually adjacent command data is reduced, thereby making possible highly efficient operation of a machine tool.

In accordance with the present invention, there is provided an acceleration/deceleration control apparatus for controlling acceleration/deceleration of a controlled object, having a plurality of drive shafts, when command data is read successively from a machining program and the controlled object is driven to a predetermined position at a commanded velocity, said apparatus comprising pulse distributing means for setting interpolation positions with regard to the controlled object, acceleration/deceleration setting means for setting an acceleration/deceleration control variable for each of the drive shafts, and control means which, when commanded velocity in a next command data block is lower than the velocity commanded by a current command data block presently being executed, is operative for performing control to stop a pulse distribution by the pulse distributing means until an actual velocity of the controlled object, being decelerated based on the acceleration/deceleration control variable, becomes lower than the commanded velocity of the next command data block.

The acceleration/deceleration control apparatus of the present invention is adapted to compare the actual velocity of the controlled object during deceleration with the commanded velocity in the next command data block and to refrain from performing a pulse distribution based on the next command data block until the two velocities coincide, thereby functioning to raise positional precision under interpolated acceleration/deceleration control. Thus, the deviation in the trajectory of the controlled object when the velocity of the commanded data decreases is eliminated. As a result, the invention prevents sag in the machining trajectory, and enables highly efficient machining control to be realized without a difference in level being produced at the time of back-and-forth machining.

BRIEF DESCRIPTION OF THE DRAWINGS

FIG. 2 is an explanatory view regarding commanded velocity before and after acceleration/deceleration control, FIG. 3 is a flowchart for describing the operation of the above embodiment.

DESCRIPTION OF THE PREFERRED EMBODIMENT

An embodiment of the present invention will now be described in detail with reference to the drawings.

Figure 1:
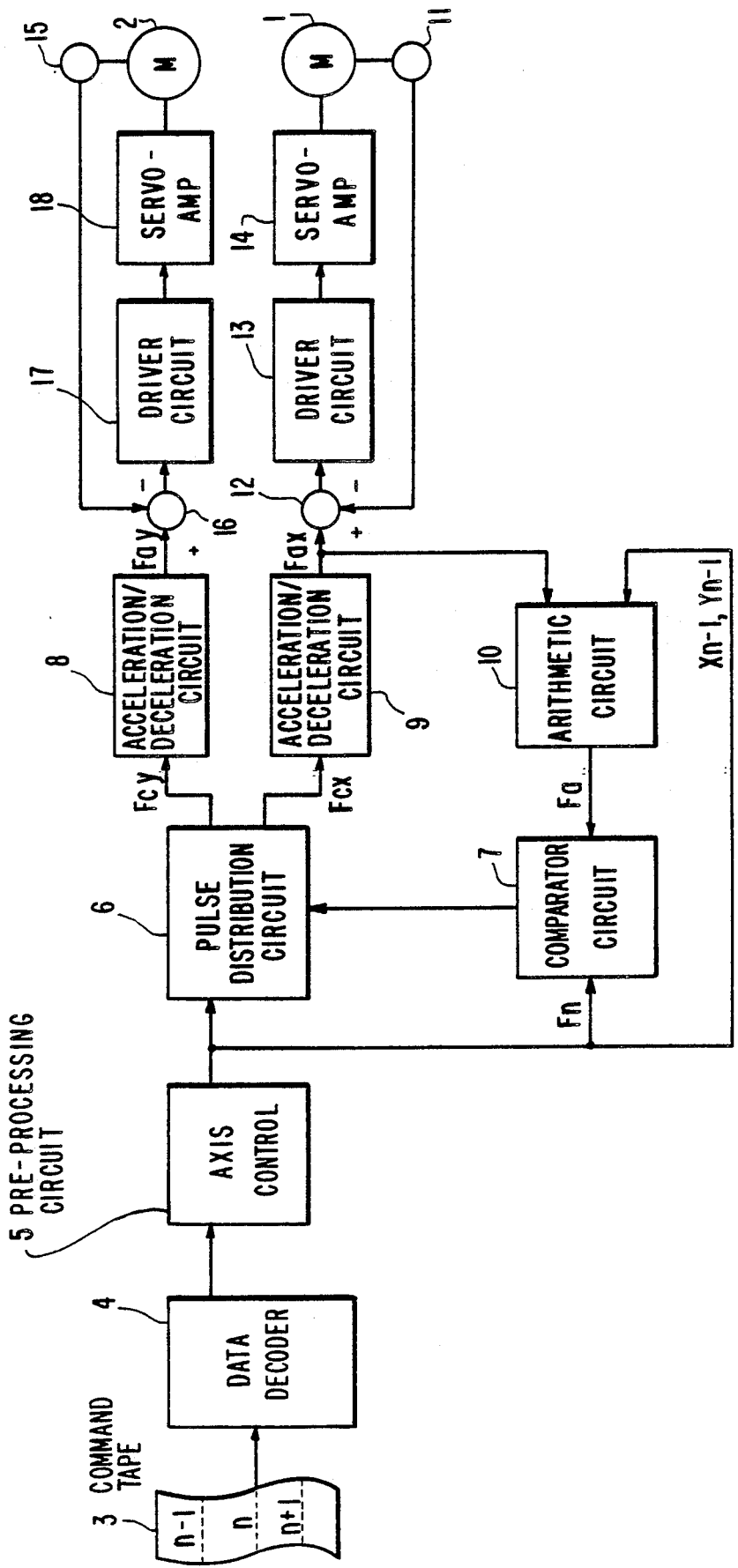
FIG. 1 is a block diagram illustrating an embodiment of the invention.
Figure 4:
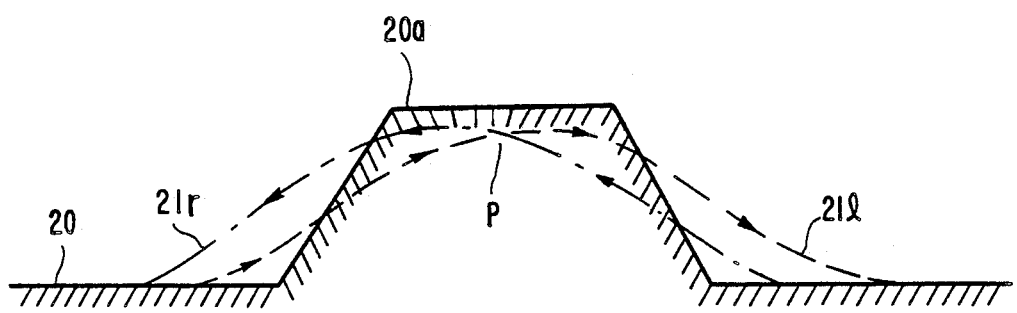
FIG. 4 is an explanatory view illustrating an example of a machining with a difference in level using a conventional acceleration/deceleration control apparatus.

FIG. 1 is a block diagram illustrating an acceleration/deceleration control apparatus of the invention. Servomotors 1, 2 form a drive mechanism for driving and controlling a cutting tool of a numerically controlled (NC) machine tool, which is an object under control, along two axes. By way of example, two-dimensional contouring is carried out by moving the cutting tool to a predetermined position at various commanded velocities in accordance with a command tape 3 read into a numerical control (NC) unit. The command tape 3 is read into a data decoder 4 of the NC unit so that information regarding velocity Fn and position Xn, Yn is decoded for every command data block. Predetermined distribution data is formed by a pre-processing circuit 5 for axis control. More specifically, the pre-processing circuit 5 decides interpolation data, which conform to a designation of, e.g., linear or circular interpolation, commanded for the cutting tool. This data is then output to a pulse distributing circuit 6 as interpolated position data.

Numeral 7 denotes a comparator circuit for comparing the command velocity Fn of the cutting tool with the actual velocity Fa of the cutting tool. The actual velocity Fa supplied to the comparator circuit 7 arrives from actual velocity computing unit, described below. When command velocities Fn−1 and Fn between consecutive command data blocks are related as follows: Fn−1>Fn, the distributing action of the pulse distributing circuit 6 is controlled in accordance with the results of the comparison performed by comparator circuit 7.

The pulse distributing circuit 6 decides the distributed pulses along each axis based on the commanded velocity Fn and interpolated position data and outputs them as command pulses Fcx, Fcy for the respective servomotors 1, 2. Numerals 8, 9 denote acceleration/deceleration circuits for applying acceleration/deceleration to the command pulses Fcx, Fcy of the respective axes at a predetermined time constant. The acceleration/deceleration circuits 8, 9, which are for the purpose of smoothening out the motion of the tool possessed by the NC machine tool, supply their respective outputs Fax, Fay as axial drive commands for the machine tool. A velocity sensor 11 connected to the X-axis servomotor 1 feeds the actual velocity back to the an adder circuit 12. A drive circuit 13 is driven and controlled by the error output of the adder circuit 12 to correct the velocity of the servomotor 1 via a servo-amplifier 14. Similarly, the Y-axis servomotor 2 has a velocity detector 15, an adder circuit 16, a drive circuit 17 and a servo-amplifier 18 and is controlled in accordance with the axial drive command Fay. The drive section of each axis is also provided with a position feedback loop, though this is not shown.

An arithmetic circuit 10 is connected to the acceleration/deceleration circuit 9 as the above-mentioned actual velocity computing unit and receives as an input the axial drive command Fax for the X-axis servomotor 1. The arithmetic circuit 10 is for computing the actual velocity Fa after acceleration/deceleration of the cutting tool driven by the two servomotors 1, 2. This is expressed by the following equation:

$$Fa = \sqrt{V^2x + V^2y} \quad (1)$$

The actual velocity is also expressed as follows from the relationship between velocity and distance in command data block units:

$$Fa = Vx \cdot \sqrt{L^2x(n-1) + L^2y(n-1)}/Lx(n-1) \quad (2)$$
$$= Vx/Kn - 1$$

Here $Lx(n-1)$, $Ly(n-1)$ represent tool travelling distances along the respective axes commanded by the $(n-1)^{th}$ command data block, and the constant $Kn-1$ represents a constant decided by the tool travelling direction.

When the actual velocity Vx of servomotor 1 is equal to the X-axis drive command Fax, the comparison of the commanded velocity Fn and the actual velocity Fa of the cutting tool performed by the comparator circuit 7 can be replaced by a comparison between Fn and Fax $\cdot\sqrt{L^2 \times (n-1) + L^2y(n-1)}/Lx(n-1)$. At the moment the reading in of the $(n-1)^{th}$ command data block ends, position data $X(n-1)$, $Y(n-1)$ regarding the commanded position is input from the pre-processing circuit 5 to the arithmetic circuit 10, which calculates the term $\sqrt{L^2 \times (n-1) + L^2y(n-1)}/Lx(n-1)$. Control is performed in such a manner that pulse distribution by the pulse distribution circuit 6 is halted by the output of the comparator circuit 7 until the X-axis drive command Fax of the $(n-1)^{th}$ command data block currently being executed is reduced to make the actual velocity Fa less than the command velocity Fn in the $(n-1)^{th}$ command data block which is to be executed next.

FIG. 2 is for describing the manner in which acceleration/deceleration control is performed to halt pulse distribution, in which (a) illustrates command pulses Fc along one axis issued from the pulse distribution circuit 6, and (b) illustrates the acceleration/deceleration-controlled drive command, namely the actual velocity Fa. As shown in (b), the drive velocity starts to be reduced from Fn−1 at time tn, and pulse distribution for the n-th command data block starts at time tn+α, which is the moment at which the actual velocity Fa becomes equal to the commanded velocity Fn in the n-th command data block which is the next block.

FIG. 3 is a flowchart for describing the operation of the apparatus discussed above.

Assuming that the machine tool is being controlled based on command data from the $(n-1)^{th}$ block of a command tape. In such case the $(n-1)^{th}$ command data block is simultaneously decoded by the data decoder 4 and read in the pre-processing circuit 5 (step a). The command velocity is output from the pre-processing circuit 5 to the comparator circuit 7. When the relationship Fn−1>Fn is established (step b), as shown in FIG. 2, the comparator circuit, 7 suspends pulse distribution of pulse distribution circuit 6 until the actual velocity Fa of the tool reduced from the command velocity Fn−1 becomes less than the command velocity Fn of the n-th command data block, which is the next block of command data (step c). Thereafter, control of the machine tool is executed so as to start the pulse distribution based on the n-th block of the command tape. It should be noted that if the relationship of Fn≦Fn+1 holds between the command velocities of consecutive command blocks, as at time tn+1 in FIG. 2, pulse distribution based on the $(n-1)^{th}$ (next) block of data starts immediately after deceleration begins.

In accordance with the above embodiment, the actual velocity is decided from the X-axis drive command Fax within the arithmetic circuit 10. Therefore, the computation need only be performed once with respect to each command data block using the constant K, thus enabling the arithmetic circuit 10 to be simplified. Of course, it is also possible to decide the actual velocity by the velocity commands Fax, Fay of the servomotors 1, 2 based on Eq. (1). Further, though the machining trajectory changes when there is a reversal in machining direction in accordance with the prior art, velocity after acceleration/deceleration control becomes symmetrical in accordance with the above-described embodiment, so that the accuracy of the machining trojectory is improved.

Although only one embodiment of the present invention has been described, the invention is not limited thereto and can be modified in a variety of ways without departing from the scope of the claims.

The acceleration/deceleration apparatus of the present invention is utilized in numerically controlled machine tools and eliminates sag in a machining trajectory, so that highly efficient machining control free of a difference in level at the time of back-and-forth machining can be realized, when controlling the acceleration/deceleration of a controlled object such as a tool having a plurality of drive shafts.

We claim:

1. An acceleration/deceleration control apparatus for controlling acceleration/deceleration of a controlled object when command data blocks are read successively from a machining program and the controlled object is driven to a predetermined position at a command velocity using servomotors, said apparatus comprising:
    pulse distributing means for setting interpolation data with regard to the controlled object and processing a current command data block of the command data blocks successively read from the machining program to distribute the interpolation data as distributed pulses to the servomotors;
    acceleration/deceleration setting means for setting an acceleration/deceleration control variable to accelerate or decelerate each of the servomotors;
    comparison means for comparing an actual velocity of the controlled object with the command velocity of a next command data block successively read from the machining program; and
    control means for controlling the pulse distribution, when the command velocity in the next command data block to be processed net by said pulse distributing means is less than the velocity command in the current command data block presently being processed by said pulse distributing means, to stop the pulse distribution by said pulse distributing means until an actual velocity of the controlled object decelerated based on the acceleration/deceleration control variable is less than the command velocity of the next command data block.

2. An acceleration/deceleration control apparatus according to claim 1, wherein said acceleration/deceleration control apparatus further comprises arithmetic means for computing the actual velocity based on travelling distances along respective axes of the servomotors and the distributed pulses, and for outputting the actual velocity signal to said control means.

3. An acceleration/deceleration control apparatus according to claim 1, wherein the controlled object subjected to acceleration/deceleration control is a tool, the tool is used to perform cutting, and cutting precision of the tool is improved when a transition is made to the next command data block having a command velocity less than the command velocity of th current command data block.

4. A acceleration/deceleration control apparatus for controlling movement of a cutting tool, having an actual velocity, of a numerically controlled machine tool along first and second axes using command data arranged in blocks, said apparatus comprising:
    decoder means for receiving he command data and for decoding the blocks of the command data into a command velocity and a command position;
    decision means for determining interpolated position data based upon the command position;
    distribution means for generating first and second distributed pulses corresponding to the first and second axes based on the interpolated data and the command velocity;
    comparison means for comparing the command velocity with the actual velocity; and
    delay means for delaying the generating of the first and second distribution pulses by said distribution means until the actual velocity corresponding to a current block of command data decelerates to an amount less than the command velocity of a next block of command data.

5. A method for eliminating deviation in machining trajectory f a machine tool, having an actual velocity, controlled by a numerical control unit using a machining program, having m command data blocks, where m is an integer, each command data block including a position command and a velocity command, said method comprising the steps of:
    (a) inputting the $(n-1)^{th}$ command data block from the machining program where $(1 \leq n \leq m)$;
    (b) executing the $(n-1)^{th}$ command data block by issuing pulse distribution pulses to the machine tool in order to control movement of the machine tool;
    (c) inputting the $n^{th}$ command data block from the machining program during said executing step (b);
    (d) determining if the magnitude of the $n^{th}$ command velocity in the $n^{th}$ command data block is less than the $(n-1)^{th}$ command velocity in the $(n-1)^{th}$ command data block;
    (e) delaying execution of the $(n-1)^{th}$ command data block until the actual velocity is less than the $(n-1)^{th}$ command velocity if said determining in step (d) is affirmative; and
    (f) executing the $(n-1)^{th}$ command data block.

* * * * *

UNITED STATES PATENT AND TRADEMARK OFFICE
CERTIFICATE OF CORRECTION

PATENT NO. : 4,994,978
DATED : FEBRUARY 19, 1991
INVENTOR(S) : HIDEAKI KAWAMURA ET AL.

It is certified that error appears in the above-identified patent and that said Letters Patent is hereby corrected as shown below:

Col. 4, line 31, "$(n-1)^{th}$" should be --n-th--;

line 67, "$(n-1)^{th}$" should be --$(n+1)^{th}$--.

Col. 6, line 21, "he" should be --the--;

line 39, "f" should be -of--;

line 56, "$(n-1)^{th}$" should be --$n^{th}$--;

line 58, "$(n-1)^{th}$" should be --$n^{th}$--;

line 60, "$(n-1)^{th}$" should be --$n^{th}$--.

Signed and Sealed this

Fourth Day of August, 1992

*Attest:*

DOUGLAS B. COMER

*Attesting Officer*     *Acting Commissioner of Patents and Trademarks*